United States Patent
Pouget et al.

(10) Patent No.: US 6,874,831 B1
(45) Date of Patent: Apr. 5, 2005

(54) FRONT STRUCTURE FOR A MOTOR VEHICLE

(75) Inventors: Laurent Pouget, Oyonnax (FR); Thierry Gourlot, Gray (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/610,779

(22) Filed: Jul. 6, 2000

(51) Int. Cl.[7] .............................................. B60R 19/52
(52) U.S. Cl. ........................ 293/115; 293/144; 293/146
(58) Field of Search ........................ 293/115, 117, 120, 293/123, 142, 143, 144, 146, 15

(56) References Cited

U.S. PATENT DOCUMENTS

| | | | | |
|---|---|---|---|---|
| D152,010 S | * | 12/1948 | Macauley | D12/170 |
| D152,398 S | * | 1/1949 | DArrin | D12/170 |
| 3,583,759 A | * | 6/1971 | Kramer | 297/451.1 |
| 3,744,835 A | * | 7/1973 | Carbone et al. | 293/120 |
| 3,877,741 A | * | 4/1975 | Wilfert et al. | 293/132 |
| 4,597,603 A | * | 7/1986 | Trabert | 296/194 |
| 4,653,788 A | * | 3/1987 | Di Giusto | 293/117 |
| 4,770,457 A | * | 9/1988 | Tomforde | 296/180.5 |
| 5,178,425 A | * | 1/1993 | Kumagai et al. | 293/120 |
| 5,460,420 A | * | 10/1995 | Perkins et al. | 293/106 |
| 5,780,125 A | * | 7/1998 | Takeuchi et al. | 428/31 |
| 6,428,065 B2 | * | 8/2002 | Sato et al. | 293/121 |
| 6,460,909 B2 | * | 10/2002 | Mansoor et al. | 293/120 |
| 6,513,843 B1 | * | 2/2003 | Frederick et al. | 293/36 |
| 6,540,275 B1 | * | 4/2003 | Iwamoto et al. | 293/24 |
| 2001/0026073 A1 | * | 10/2001 | Sato et al. | 296/121 |
| 2002/0101085 A1 | * | 8/2002 | Gehringhoff et al. | 293/120 |
| 2003/0067178 A1 | * | 4/2003 | Bastien et al. | 293/120 |
| 2003/0067179 A1 | * | 4/2003 | Bastien et al. | 293/120 |

FOREIGN PATENT DOCUMENTS

| | | |
|---|---|---|
| FR | 2 655 605 | 6/1991 |
| FR | 2 761 330 | 10/1998 |
| JP | 2001-277963 A * | 10/2001 |
| JP | 2002-205613 A * | 7/2002 |
| JP | 2002-274298 A * | 9/2002 |
| JP | 2002-337634 A * | 11/2002 |
| WO | WO 01/00478 A1 * | 1/2001 |

OTHER PUBLICATIONS

Patent Abstracts of Japan, vol. 006, No. 146 (M-147), Aug. 5, 1982, JP 570666046.

* cited by examiner

*Primary Examiner*—D. Glenn Dayoan
*Assistant Examiner*—Patricia L. Engle
(74) *Attorney, Agent, or Firm*—Schweitzer Cornman Gross & Bondell LLP

(57) ABSTRACT

A front structure for a motor vehicle having a bumper cross-member and a grille, the structure being fabricated as a unitary piece of plastics material.

15 Claims, 2 Drawing Sheets

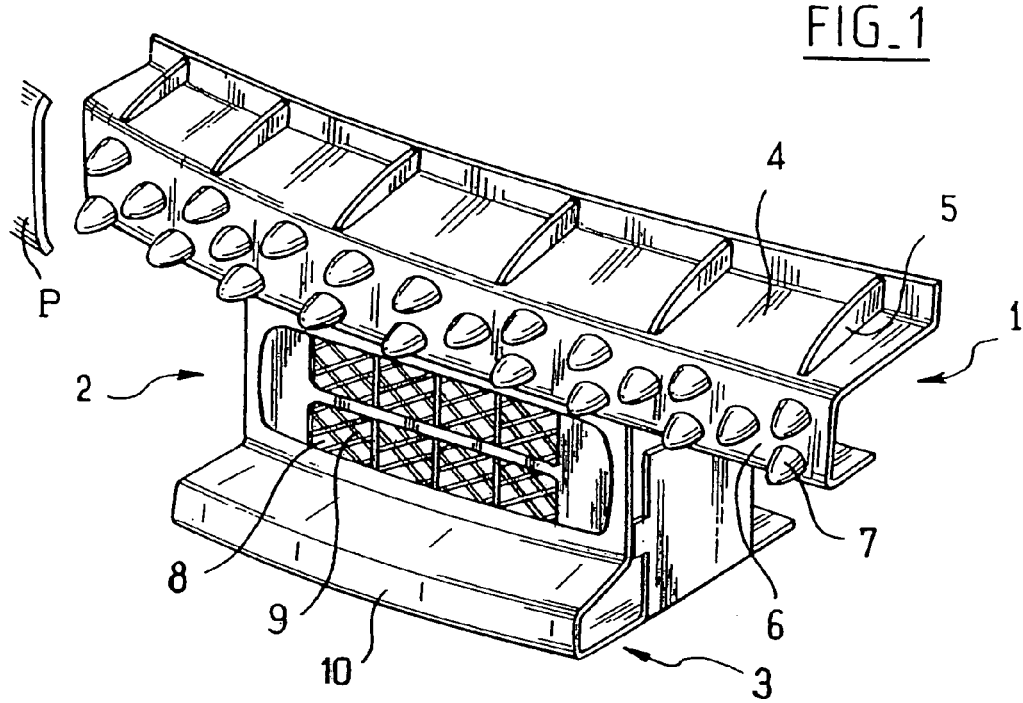
FIG_1
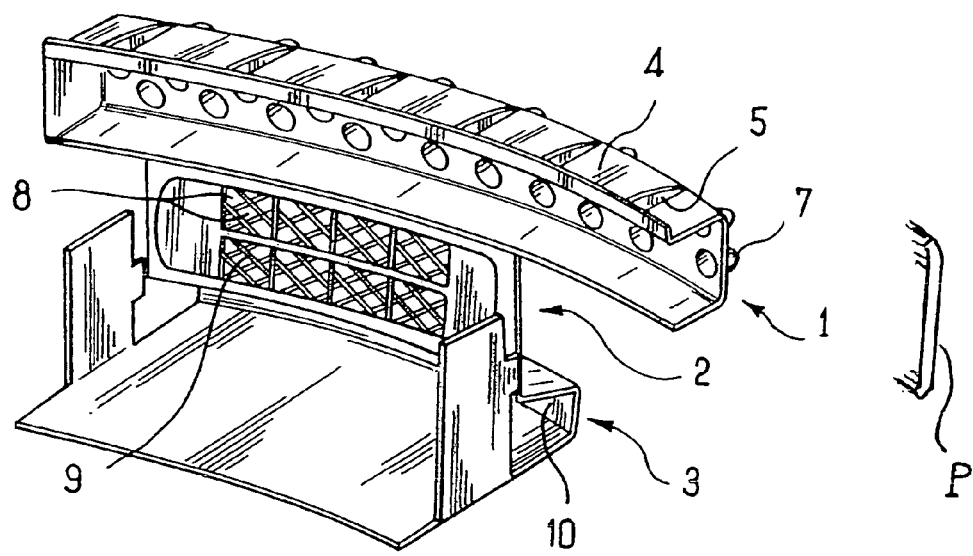
FIG_2

FRONT STRUCTURE FOR A MOTOR VEHICLE

The present invention relates to a front structure for a motor vehicle.

BACKGROUND OF THE INVENTION

At the front of a conventional motor vehicle, there are generally to be found a bumper cross-member, an air inlet grille, and possibly a bottom part which can constitute a spoiler member, protection for the engine, or a bottom bar that acts in the event of a collision with a pedestrian.

These various portions are made up of separate parts made of various materials which are assembled together on the vehicle, generally by means of screws, at predetermined anchor points.

These parts are independently designed so that each of them presents the required mechanical properties, depending on its own functions.

This gives rise to an assembly made up of these three parts which is relatively heavy, since each part on its own is required to perform the function assigned to it.

Japanese patent application 55 137 760 describes a structure having a cross-member for receiving a bumper.

Such a support structure does not itself comprise a bumper, with the bumper being constituted by a distinct part fitted thereto.

OBJECTS AND SUMMARY OF THE INVENTION

The present invention seeks to provide a novel front structure for a motor vehicle in which synergy is implemented between the various parts so as to reduce the overall weight of the assembly.

Such a structure is designed to receive a shielding skin that covers it in part or in full.

The present invention provides a front structure for a motor vehicle, the structure comprising at least one bumper cross-member and a grille, the structure being made a single piece of plastics material.

In a particular embodiment, the structure includes a third portion on the opposite side of the grille to the cross-member.

In the structure of the invention, the continuous link which exists between two adjacent parts enables each of the parts to confer stiffness to its neighbor(s) such that each part considered in isolation can be made to be less strong or less rigid than the corresponding part would need to be were it to be separate.

Furthermore, the fact of making a plurality of parts as a single piece gives rise to advantages which lead to lower cost price, both in manufacturing terms, given that a smaller quantity of plastics material is required for making the parts, and in assembly terms, given that the one-piece structure requires a smaller amount of handling for installation in a vehicle.

The plastics structure of the invention can also be made to include specific functions merely by providing the corresponding shapes in the mold cavity.

In a particular embodiment of the invention, the grille is a grille for providing protection against chippings.

In another particular embodiment of the invention, the bumper cross-member includes shock absorbers integrated therein the form of egg-shaped bulges or of a honeycomb.

In the embodiment in which the structure has a third portion, the third portion can constitute protection beneath the engine or a converging portion for guiding the flow of air passing beneath the vehicle, or indeed a bottom bar which forms a portion that projects from the front of the vehicle for the purpose, in the event of a collision with a pedestrian, of striking the legs of the pedestrian below the knee at the same time as the bumper strikes the legs above the knee.

In a particular embodiment, the structure receives a shielding skin which covers it in part or in full but which serves for the purposes of appearance only, with forces in the event of an impact being absorbed in full by the structure.

It is of interest to observe that the reduction in weight obtained by using the invention can also make it possible to use a shielding skin that is finer than in traditional structures because, in the invention, the skin is for the purposes of appearance only, with forces being absorbed in full by the structure.

BRIEF DESCRIPTION OF THE DRAWINGS

To make the invention better understood, there follows a description of two embodiments given as examples that do not limit the scope of the invention, and described with reference to the accompanying drawings, in which:

FIG. 1 is a three-quarters front perspective view of a structure constituting a first embodiment of the invention;

FIG. 2 is a three-quarters rear perspective view of the FIG. 1 structure;

MORE DETAILED DESCRIPTION

Figure 3:
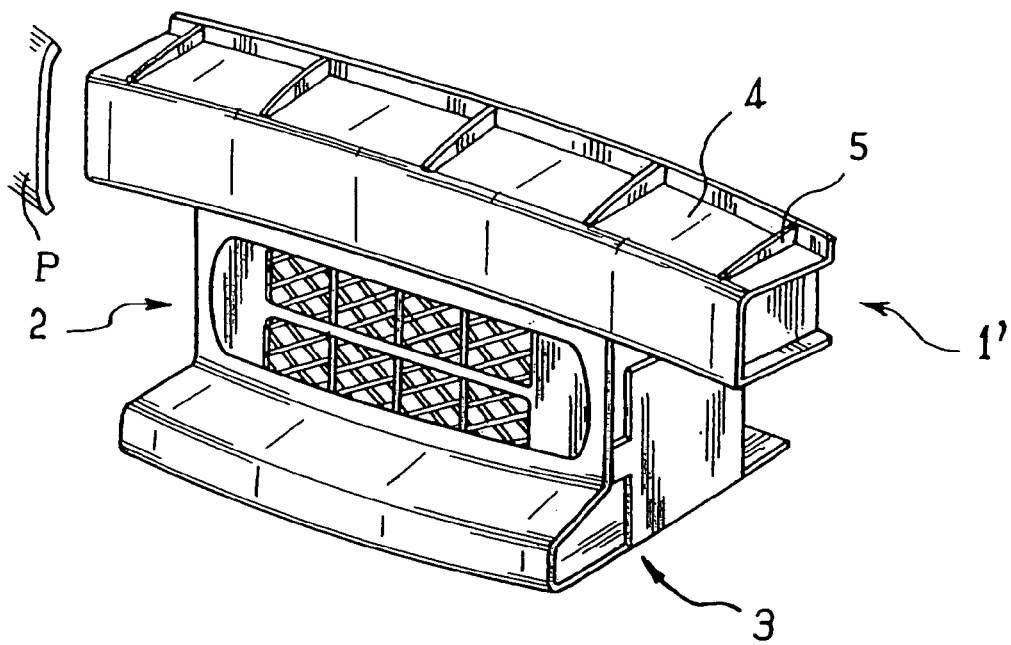
FIG. 3 is a three-quarters front perspective view of a structure constituting a second embodiment of the invention.

The structure of FIGS. 1 and 2 comprises a top bumper cross-member 1, an anti-chippings grille 2, and an under-engine protection 3 that is also used as a bottom bar.

The assembly is made as a single piece of plastics material, e.g. of polypropylene.

The top cross-member 1 is a channel section member. It is reinforced on its top face 4 by ribs 5 extending parallel to the direction of compression in the event of a front impact.

The front face 6 of the top cross-member is provided with projecting egg-shaped shock absorbers 7 which, like the ribs 5, are integrally molded with the remainder of the structure.

The anti-chipping grille 2 is a plate that is perforated in its central portion with openings 8 that allow a flow of air to pass to a radiator (not shown) mounted behind said grille 2. These openings 8 are of dimensions suitable for retaining the chippings which might damage the radiator while the vehicle is running.

Since the same plastics material is used for making the entire structure, it is necessary, when dimensioning the rods 9 for making up the mesh of the grille, to allow for the flexibility of the plastics material which is essential for enabling the cross-member to absorb impact shock.

In other words, during design of the part, it is important to avoid designing rods that are too thin, as might be appropriate for independent grilles of the prior art, since such rods might deform under the impact of chippings and allow some of them to strike the radiator.

The under-engine protection 3 is shaped in such a manner as to extend beneath the engine (not shown) at the front of the vehicle for the purpose of protecting engine components from possible impact against small objects carried by the flow of air passing beneath the vehicle.

This protection also serves to make the flow of air as laminar as possible so as to avoid slowing down displacement of the vehicle excessively.

Finally, it should be observed that the under-engine protection has a portion 10 that projects forwards. This projecting portion 10 is a bottom bar whose function is to constitute a point of impact against the legs of a pedestrian that is struck by the vehicle.

This bottom bar co-operates with the top cross-member 1 which usually strikes a leg of a pedestrian above the knee, whereas the bottom bar strikes the leg beneath the knee. Combining these two points of impact serves to distribute force along the leg, and above all serves to avoid damaging the knee joint excessively.

The structure shown in FIGS. 1 and 2 is quite stiff overall, given the links between the portions extending across the entire width thereof, and this applies even though each portion, when considered in isolation, is lighter in weight than the equivalent part of a composite structure in which parts are assembled together via localized fixing points.

The cross-member 1 receives a shielding skin P which is shown in part only and in highly diagrammatic manner in order to clarify the drawing.

Figure 4:
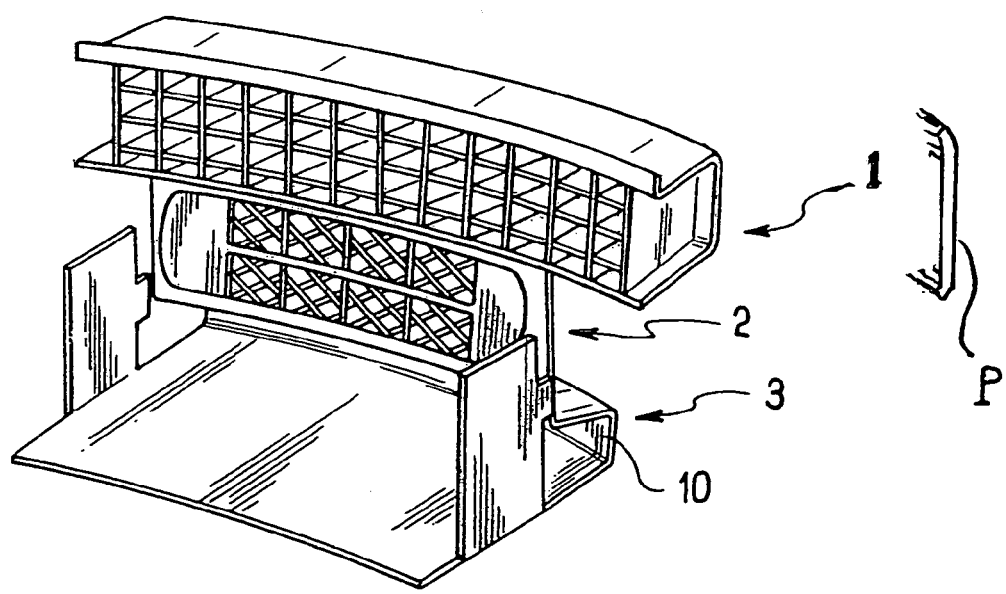
FIG. 4 is a three-quarters rear perspective view of the FIG. 3 structure.

In the embodiment of FIGS. 3 and 4, only the cross-member 1' differs from the preceding embodiment.

The cross-member 1' of this second embodiment has a honeycomb structure replacing the egg-shaped shock absorbers, as can be seen more clearly in FIG. 4.

Naturally, the embodiments described above are not limiting in any way and could be modified in any desirable manner without thereby going beyond the ambit of the invention.

What is claimed is:

1. A front structure for a motor vehicle, the structure comprising:
    at least one bumper cross-member,
    a grille,
  wherein the structure is made integrally in one piece out of plastics material, and wherein the structure is configured for receiving a shielding skin, said shielding skin being made separately from said structure and permanently covering the structure at least partially.

2. A structure according to claim 1, including a third portion beneath the grille.

3. A structure according to claim 2, wherein the third portion is configured to form an under-engine protection.

4. A structure according to claim 2, wherein the third portion comprises a converging portion for guiding the flow of air passing beneath the vehicle.

5. A structure according to claim 2, wherein said bumper cross-member and said third portion project from the front of the vehicle and have front ends which are situated substantially in a same plane.

6. A structure according to claim 1, wherein the grille is an anti-chipping grille.

7. A structure according to claim 1, wherein the bumper cross-member includes shock absorbers integrated therein.

8. A structure according to claim 7, wherein the shock absorbers comprise egg-shaped bulges.

9. A structure according to claim 7, wherein the shock absorbers comprise a honeycomb.

10. A structure according to claim 1, wherein the shielding skin covers the structure in full, and performing an appearance function only, with any force in the event of an impact being fully absorbed by the structure.

11. A front structure for a motor vehicle, said structure being made integrally in one piece out of plastics material and comprising:
    at least one bumper cross-member having a U-shaped cross-section and forming an uppermost substantially horizontal face of the front structure,
    a plurality of reinforcing ribs on said uppermost face extending parallel to the direction of compression in the event of a front impact, and
    a grille.

12. A front structure for a motor vehicle, said structure being made integrally in one piece out of plastics material and comprising:
    at least one bumper cross-member comprising a front wall having a plurality of shock absorbers having egg-shaped bulges, said bulges each having a substantially circular base, and
    a grille.

13. A front structure for a motor vehicle, said structure being made integrally in one piece out of plastics material and comprising:
    at least one bumper cross-member,
    a grille, and
    a projecting portion situated in a lowermost part of the structure,
  said bumper cross-member and said projecting portion projecting from the front of the vehicle and having front ends which are situated in a common substantially vertical plane, the grille being situated between the bumper cross-member and the projecting portion.

14. A front structure for a motor vehicle, the structure comprising:
    at least one bumper cross-member comprising egg-shaped bulges integrated therein,
    a grille,
  wherein the structure is made integrally in one piece out of plastics material, and
  wherein the structure is configured for receiving a separate shielding skin, said shielding skin not being made integrally with said structure and covering at least portions of the structure.

15. A front structure for a motor vehicle, the structure comprising:
    at least one bumper cross-member comprising a honeycomb integrated therein,
    a grille,
  wherein the structure is made integrally in one piece out of plastics material, and
  wherein the structure is configured for receiving a separate shielding skin, said shielding skin being not made integrally with said structure and covering at least portions of the structure.

* * * * *